(12) United States Patent
Beck et al.

(10) Patent No.: US 7,831,836 B2
(45) Date of Patent: Nov. 9, 2010

(54) CHARACTER POSITION-BASED PASSWORD RECOVERY

(75) Inventors: Robert L Beck, Seattle, WA (US); Kevin Sullivan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 11/538,791

(22) Filed: Oct. 4, 2006

(65) Prior Publication Data

US 2008/0086644 A1 Apr. 10, 2008

(51) Int. Cl.
*G06F 21/00* (2006.01)
(52) U.S. Cl. .................. 713/183; 713/184; 715/200
(58) Field of Classification Search .......... 713/183, 713/184; 715/200
See application file for complete search history.

(56) References Cited

U.S. PATENT DOCUMENTS 4,164,025 A * 8/1979 Dubnowski et al. ......... 715/210
5,706,496 A * 1/1998 Noguchi et al. ............... 707/3
2004/0168068 A1 * 8/2004 Goal et al. .................. 713/184
2006/0041932 A1 2/2006 Cromer et al.
2008/0086644 A1 * 4/2008 Beck et al. .................. 713/183

FOREIGN PATENT DOCUMENTS

JP      11212922 A2    8/1999
JP      2002084272 A2  3/2002
WO      WO2005045550 A2  5/2005

OTHER PUBLICATIONS

PCT Search Report and Written Opinion for PCT Application No. PCT/US2007/080399, which is a counter part of the instant application, mailed on Feb. 28, 2008, 10 Pgs.
"The Bitmill: Strong Passwords 101 Password Length", retrieved on Sep. 14, 2006 at <<http://www.thebitmill.com/articles/password_lenght.html>>, 4 pages.

* cited by examiner

Primary Examiner—Thanhnga B Truong
Assistant Examiner—Angela Holmes
(74) Attorney, Agent, or Firm—Lee & Haynes, PLLC (57) ABSTRACT

A password recovery technique includes generating words by sequentially selecting a character for each character position of the word from a character string. The order of the characters in the character string is individually selected for each position of the word. Each sequentially generated word may be entered until the password is determined.

14 Claims, 8 Drawing Sheets

Permissible characters  abcdefghijklmnopqrstuvwxyz
Password length  1-3
Total Possible Combinations: 18,278

Character string for character position #1 = abcdefghijklmnopqrstuvwxyz
Character string for character position #2 = pbmacdefghijklnoqrstuvwxyz
Character string for character position #3 = abcdefghijklmnopqrstuvwxyz Character strings selected based on order of frequency of occurrence of each character in a sample of existing passwords.

Permissible characters [ lower case letters and/or numbers ]
Password length [ 1-7 ]
Total Possible Combinations: 80,603,140,212

Character string for character position #1 = scpabtmdrhfguelionwvkjqyz0x312465789
Character string for character position #2 = aeorisucnphltmbdfgwvykjqxz0132647859
Character string for character position #3 = aeorinslcutpmhbdgfwvykjxqz0132467589
Character string for character position #4 = aeroinstlcupmdhbgfwvykxjqz0123465789
Character string for character position #5 = earointslcupmdhbgfywkvxjzq0123465789
Character string for character position #6 = eairontslcupmdhbgfywvkxzjq0123465789
Character string for character position #7 = eairontslcupdmhbgfywkvxzjq0123465879

Character strings selected based on order of frequency of occurrence of each character in an English language dictionary including words, names, dates, and common misspellings.

CHARACTER POSITION-BASED PASSWORD RECOVERY

BACKGROUND

As personal computers have gained widespread use, passwords have become ever more important to protect sensitive information, by limiting access computers and the data stored on them. A problem arises, when users forget their passwords or are unavailable when access to the information is needed. Password recovery (or "password cracking") is the processes of determining an unknown password. Typical password recovery agents or cracking programs iteratively generate words in an effort to determine the password. Typically the words are generated in a linear fashion, from a predetermined standard character string.

The password recovery process can require considerable processing resources and time, depending on the size of the password that is being recovered (i.e., the allowable number of character positions that the password may have) and the number of permissible characters that the password may include (e.g., lower-case letters, capital letters, numbers, spaces, symbols, etc.). For each additional allowable character position, the time to recover the password increases exponentially. For passwords, of six or more characters, checking all possible character combinations into this 6th place can mean days of recovery time.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, this disclosure describes character position-based password recovery techniques, which allow character strings used to sequentially generate passwords to be specified on a "per-position" basis.

In one implementation, words may be generated by sequentially selecting a character for each character position of the word from a character string. The order of the characters in the character string is individually selected for each position of the word. Each sequentially generated word may be entered until the password is determined.

In some implementations, character strings may be organized according to the likelihood each character will occur at each position.

BRIEF DESCRIPTION OF THE DRAWINGS

In the figures, the left-most digit of a reference number identifies the figure in which the designated component or act first appears.

DETAILED DESCRIPTION

Overview

Passwords have become a commonly used security mechanism for protecting sensitive information stored on computers, networks, servers, websites, storage media and the like. Generally, passwords provide a convenient way of protecting such information. Occasionally, however, a user may forget his or her password, or may be unavailable when access to the information is needed. In that case, the user or other authorized personnel may wish to recover or crack the password to gain access to the sensitive material. Typical password recovery agents rely on a single predetermined character string to generate words. This disclosure is directed to password recovery (or "cracking") using character position-based techniques. In various implementations, these character position-based techniques may allow the use of multiple and/or strategically selected character strings for word generation, and may significantly reduce the time and resources required to recover a password. A "word" as used herein may include any combination of letters, numbers, symbols, shapes, spaces, and/or other characters.

Exemplary Context

Figure 1:
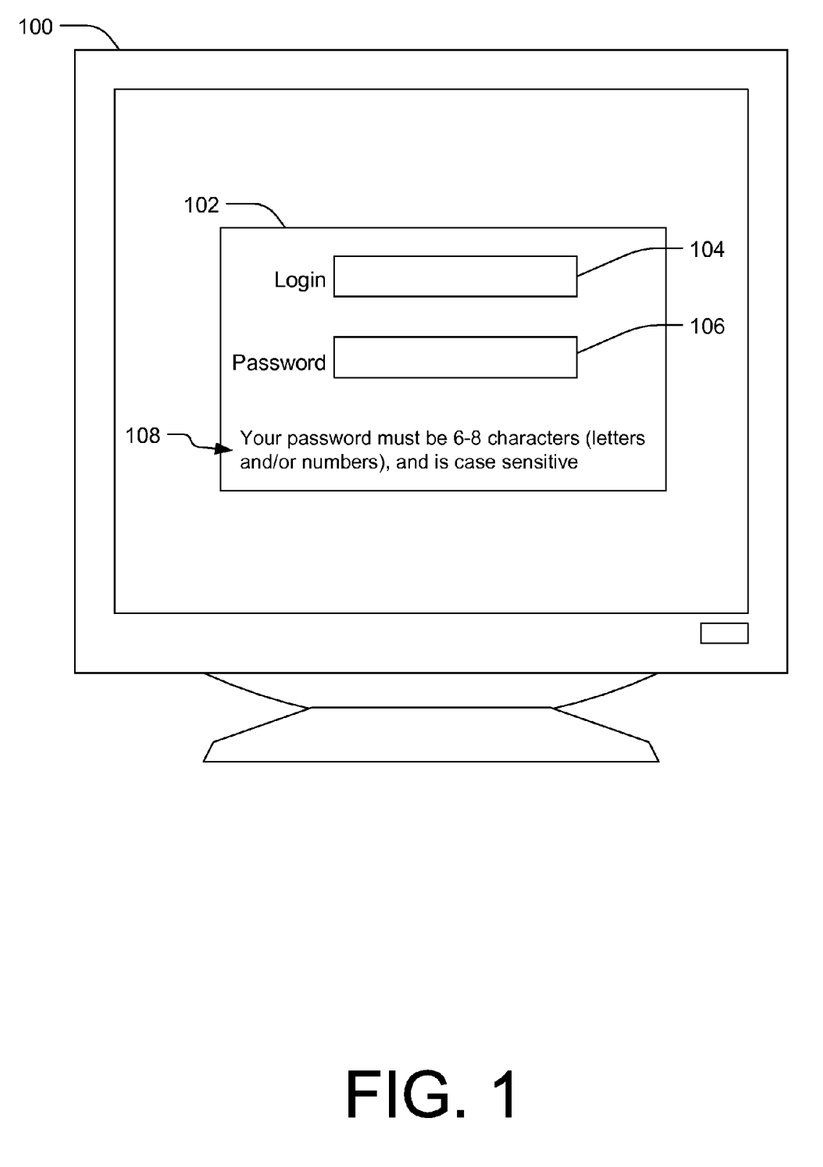
FIG. 1 is a schematic diagram of an exemplary computer screen with a login and password screen displayed.

FIG. 1 shows a personal computer 100 which is protected by a password. A user is not allowed to access the information stored on the computer until they have logged in. A login interface 102 is displayed on a screen of the computer 100 for this purpose. The login interface 102 includes a login prompt 104 for a user to enter a login name, and a password prompt 106 for the user to enter his or her password. An information message 108 may be provided on the login interface 102, informing the user of the required password length and permissible characters. In the illustrated implementation, the password must be 6-8 characters long, may include letters and/or numbers, and is case sensitive.

If the user is unable to remember the password, he or she will be unable to log into the computer 100. In some instances, the user may be allowed to reset the password, a hint may be provided to the user to help the user remember the password, and/or the password may be provided to the user in response to the user answering one or more security questions (e.g., mother's maiden name, city of birth, etc.). In the absence of such options, or if the user is still unable to remember the password, it may be necessary to recover or crack the password to gain access to the protected material.

Exemplary Password Recovery Techniques

Password recovery can be a lengthy process depending on the size of the password that is to be recovered (i.e., number of positions) and the number of permissible characters for each position. For each additional character, the time to recover the password increases exponentially. Specifically, the number of possible passwords can be expressed as follows:

$$\text{Number of Possible Passwords} = \sum_{N=X}^{Y} P^N \quad (1)$$

where P is the number of permissible characters that can be used in the password, N is the password length in terms of the number of character positions, and X and Y are the minimum and maximum allowable password lengths, respectively, also in terms of the number of character positions.

Figure 2:
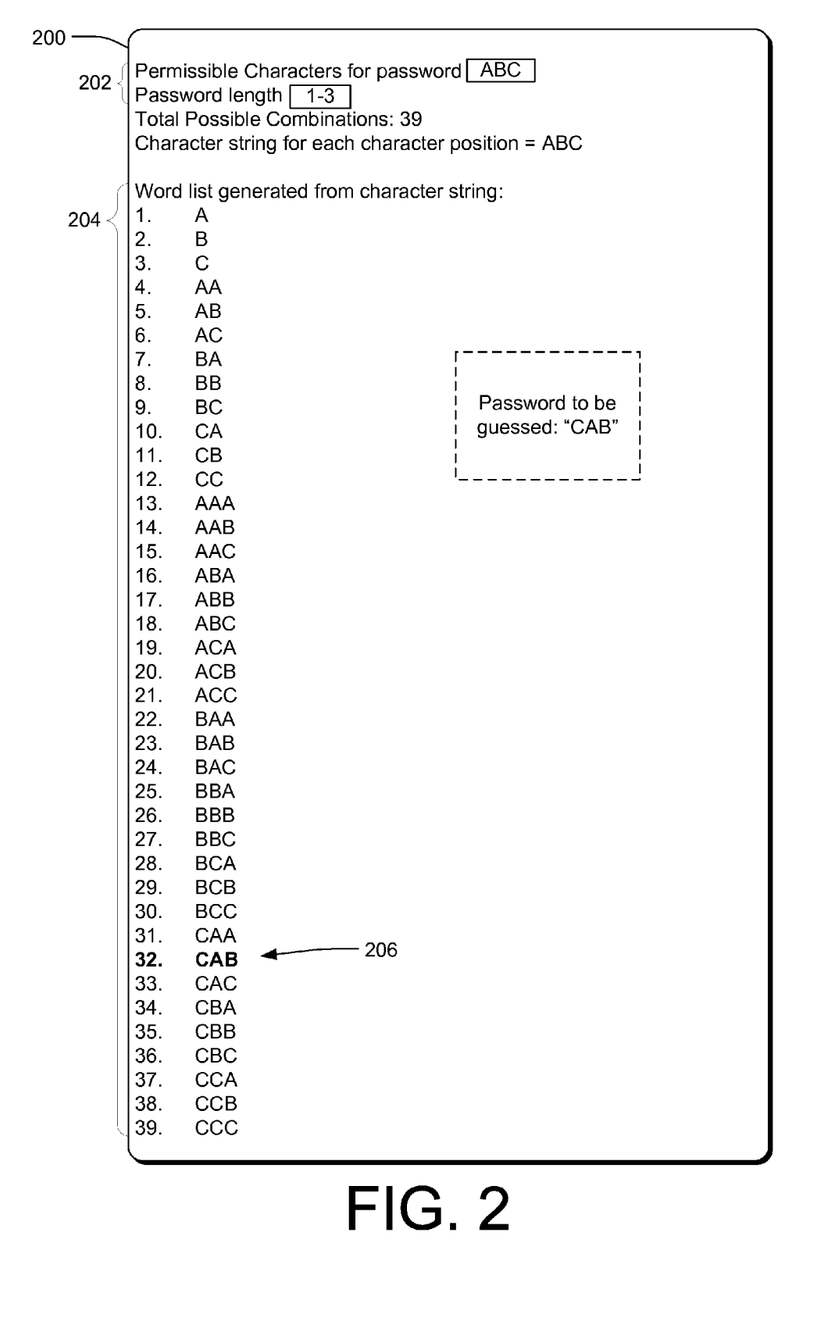
FIG. 2 is a block diagram showing a representative password recovery technique using a single predetermined character string for each character position of a password.
Figure 3:
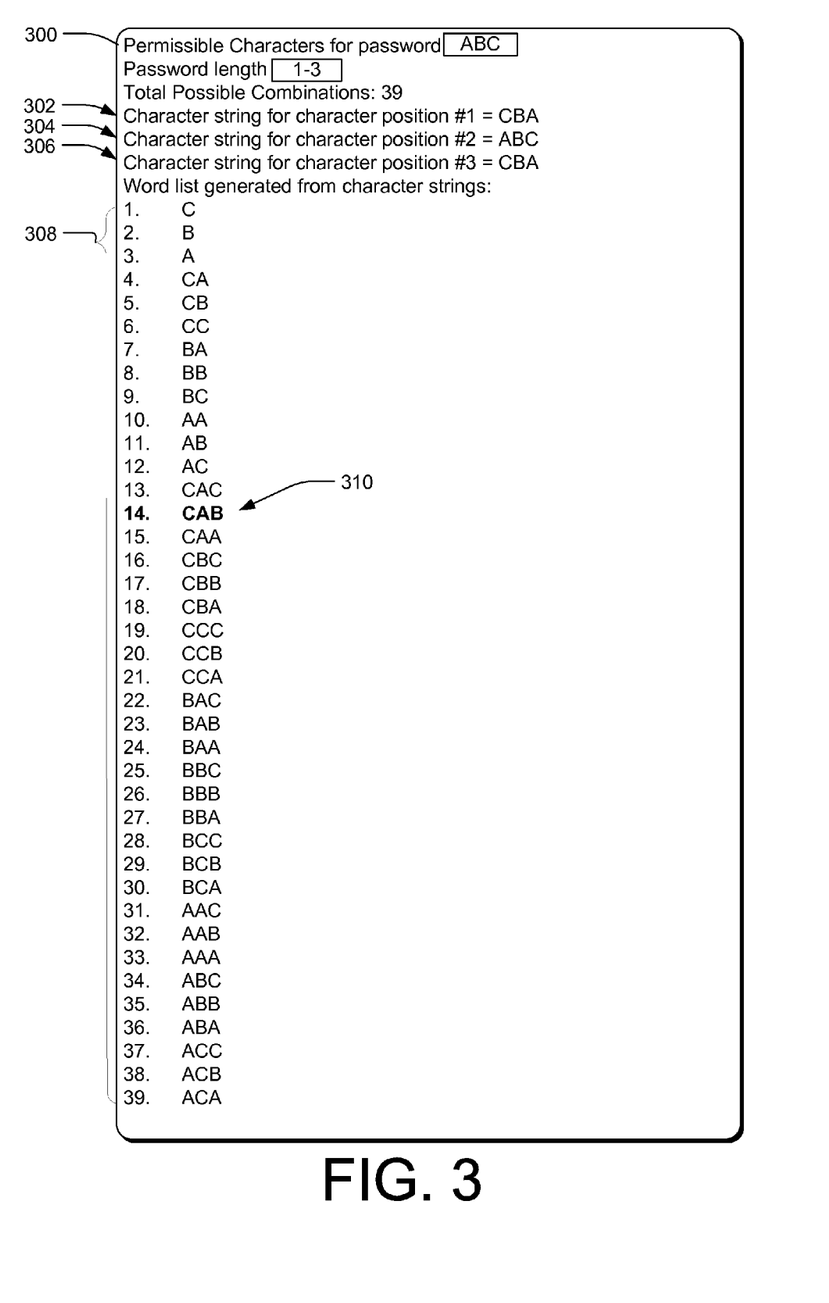
FIG. 3 is a block diagram showing an exemplary password recovery technique using an individual character position-based character string for each character position of a password.

FIGS. 2 and 3 show a simple password recovery situation. In the illustrated situation, passwords may have a length N of one to three positions, and there are three permissible characters P that can be used for each position {A, B, C}. Applying equation 1 above, the permissible characters A, B, and C can be combined in thirty-nine possible passwords of one to three characters in length (i.e., $3^1+3^2+3^3=39$). In the illustrated situation, a user has previously created a password "CAB" (one of the thirty-nine possible passwords), but has now forgotten the password.

FIG. 2 shows a representative password recovery program 200. In this implementation, a user may be asked to enter some criteria 202 for suitable passwords, such as the allowable length of the password (1-3 positions in this case) and the permissible set of characters that can be used in the password (in this case A, B, and C). The program 200 then generates a "wordlist" 204 in a sequential fashion using a single predetermined character string "ABC" for all positions of the generated words. The wordlist is comprised of words sequentially generated by cycling through the predetermined character string for each character position until all possible combinations are attempted. Thus, the first word generated is "A", the second word is "B", the third word is "C", the fourth word is "AA", the fifth word is "AB", and so on, as shown in FIG. 2. This process continues until the password is generated. In the example of FIG. 2, the forgotten password "CAB" will not be discovered until the thirty-second word 206 is generated.

In examining this methodology for guessing passwords, it becomes apparent that the words beginning with the first letter of the character string will be generated sooner during the recovery process than those beginning with a subsequent letter in the character string. If all thirty-nine of the possible passwords were equally likely to be used, then the order of the characters in the character string would be unimportant. However, in practice, passwords are often based, at least in part, on common character combinations, such as words, names, dates, acronyms, initials, combinations of these, and/or other character combinations which are more memorable than random combinations of characters. Thus, if the character string used for word generation was rearranged in the order that the characters are used in the potential passwords, the time required to guess the password would be reduced. This time could be further reduced if different character strings were used for each different position in the words. For example, the character string for each position could be organized based on the frequency the characters occur at each position in, for example, a language such as the English language, a sample of existing passwords, or the like.

FIG. 3 is shows an exemplary password recovery program 300 using a character position-based approach, in which at least one character string used to generate words is organized based on the frequency the characters occur at each position in a hypothetical sample of existing three-word passwords. In one example, the password may be chosen from the permissible character set {A, B, C}. In the example of FIG. 3, we assume that the character C was the most common character used in the first and third positions of passwords in the sample of existing passwords, followed by B, and then A. The character A was the most common character used in the second position of the passwords in the sample, followed by B, and then C.

Based on these hypothetical findings, the character strings used for word generation were, organized in the same order of frequency of occurrence at that position as found in the sample of passwords (from most frequent to least frequent). Thus, a first character string 302 used for the first character position was C, B, A, a second character string 304 used for the second character position was A, B, C, and a third character string 306 used for the third character position was C, B, A. A word list 308 was generated using these character strings. In this character position-based implementation, the forgotten password "CAB" will be generated as the fourteenth word 310; much sooner than in the example of FIG. 2.

From the foregoing description, character position-based word generation allows the user to specify character strings on a "per-position" basis, for sequentially generating passwords in a cracking session. This allows a user to employ a set of character strings organized according to the likelihood each character will occur at each position, in an attempt to recover passwords more quickly.

Realistically, with only thirty-nine different possible passwords, the three-character password of FIGS. 2 and 3 would be trivial to crack, taking a few seconds at most. However, the password recovery time increases with the number of permissible characters and the allowable length of the passwords. Also, while the implementation shown in FIG. 3 would only be useful to retrieve passwords formed from the characters A, B, and C, the concept can be expanded to include passwords using any other characters desired, including letters (lower case and/or capital), numbers, symbols (punctuation or otherwise), spaces, shapes, and the like.

Figure 4:
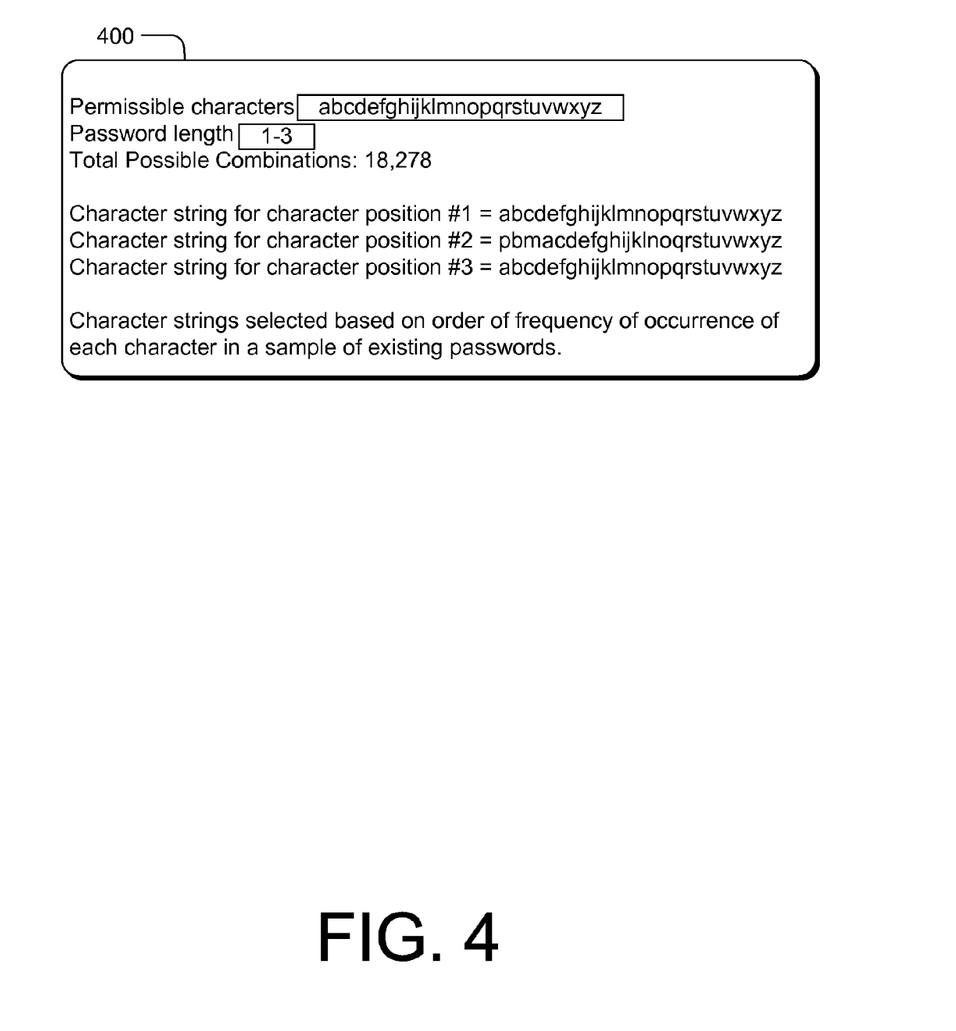
FIG. 4 is a block diagram showing another exemplary password recovery technique using an individual character position-based character string for at least one character position of a password.

FIG. 4 shows another exemplary password recovery program 400 usable to recover a password. In this example, the password may be one to three characters long, and may be formulated from twenty-six permissible characters (in this case the lowercase alphabet a-z). Suppose, in this example, that research performed on all passwords in a given environment, showed that the first character in passwords had an equal chance of being any one of the lowercase alphabetic characters, but that the letters "p," "b," and "m" were the most common characters in the second character position of all passwords. Using the character position-based word generation techniques, the character strings used for a three-character password might appear as follows:

Character string for position #1="abcdefghijklmnopqrstuvwxyz"

Character string for position #2="pbmacdefghijklnoqrstuvwxyz"

Character string for position #3="abcdefghijkltnopqrstuvwxyz"

These character strings would be more effective in a timed scenario in guessing the passwords for this environment, based on the research previously performed on the passwords used in this environment.

Such research of existing passwords is one possible way to determine character strings used for character position-based word generation. However, various other ways of determining character strings used for character position-based word generation are also possible. For example, by analyzing grammatical rules or dictionaries for a given language (such as the English language), a user can determine the most common characters in a given word position. Using this information, the user can create character strings used for character position-based word generation listing the characters in order of frequency of occurrence at each character position of a word. Using this method, a user can reasonably assume that such character position-based character strings will be more effective in cracking passwords than a default character string listing the available characters in a standardized sequence (such as alphabetic, chronologic, or the like).

Figure 5:
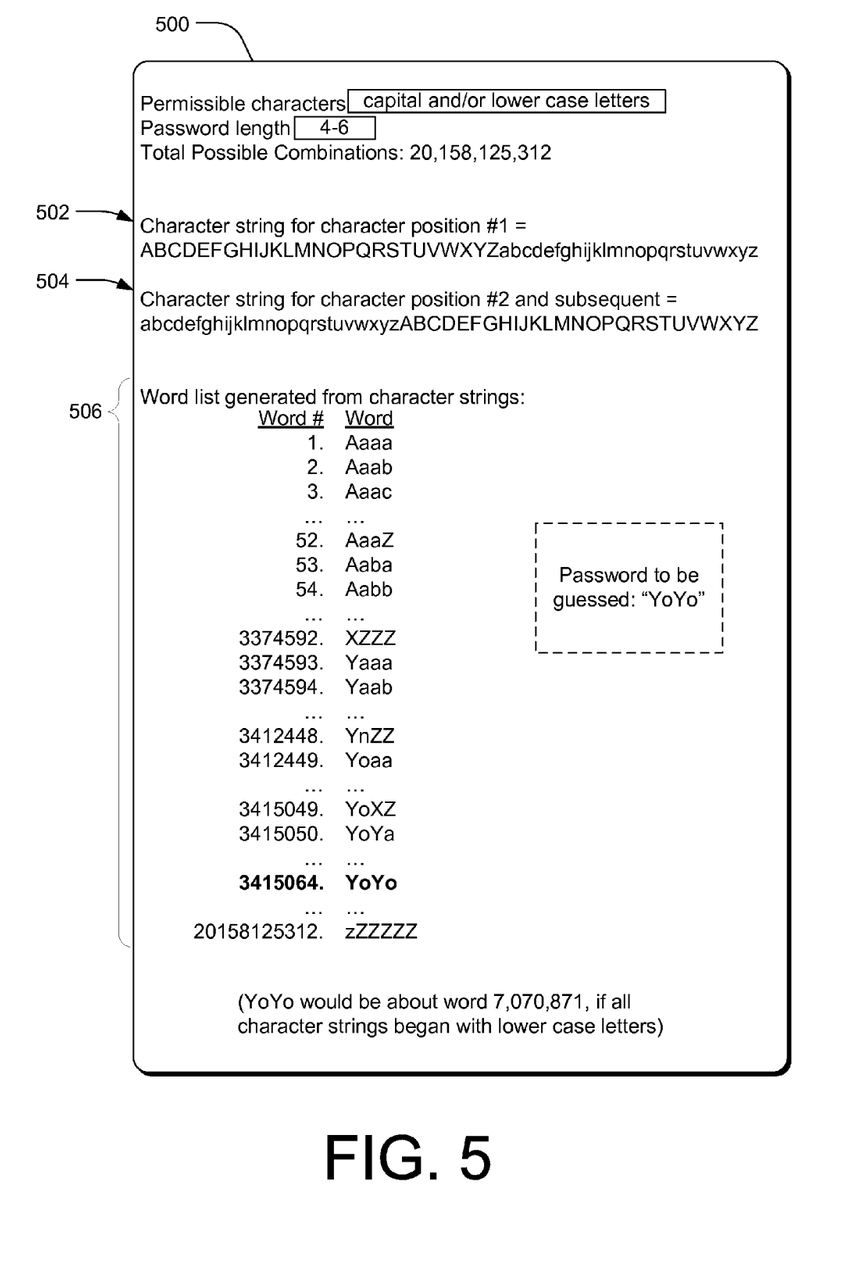
FIG. 5 is a block diagram showing another exemplary password recovery technique using an individual character position-based character string for at least one character position of a password.

FIG. 5 shows an exemplary implementation using character strings organized based on grammatical rules. As discussed above, passwords tend to be based, at least in part on common words, names, dates, acronyms, initials, and the like. At least in the English language, names, dates, acronyms, initials, and the first word of a sentence all typically begin with a capital letter. Thus, when capital and lowercase letters are permissible characters for a password, the recovery time may additionally or alternatively be reduced by organizing a character string corresponding to the first character position with the capital letters first. The character strings used for the second and subsequent character positions may be organized with lowercase letters first, or in any other desired order.

FIG. 5 shows an exemplary password recovery program 500, usable to recover a password. In one example, the password may be four to six characters long, and may be formulated from fifty-two permissible characters (abcdefghijklmnopqrstuvwxyzABCDEFGHIJKLEMOPQRSTUVWXYZ). In that case, over twenty billion different passwords are possible (20,158,125,312 to be exact), which would require significant recovery time.

For the purpose of illustration, assume that the password to be recovered in this case is "YoYo." In this implementation, a first character string 502 corresponding to the first character position of the password begins with capital letters followed by lowercase letters (ABCDEFGHIJKLMNOPQRSTUVWXYZabcdefghijklmnopqrstuvwxyz). A second character string 504 corresponding to the second and subsequent character positions is arranged with lowercase letters followed by capital letters (abcdefghijklmnopqrstuvwxyzABCDEFGHIJKLMNOPQRSTUVWXYZ). For every character position in the illustrated implementation the capital and lowercase letters are arranged in alphabetical order. However, the letters could alternatively be arranged in different orders. For example, the letters could be arranged in reverse alphabetical order, random order, or in the order of frequency the characters occur at each position in, for example, a language such as the English language, a sample of existing passwords, or the like. Moreover, the lowercase letters could be organized in one order, while the capital letters are arranged in another. In one example, a character string might be (abcdefghijklmnopqrstuvwxyzZYXWVIITSRQPONMLKJIHGFEDCBA).

A word list 506 is generated using the character strings 502 and 504. In this manner, the password "YoYo" is generated as about word number 3,415,064 on the word list 506. However, if a character string beginning with alphabetically arranged lowercase letters was used for all positions, the password would not have been generated until about word number 7,070,871—a time savings of over 50% in this scenario.

Figure 6:
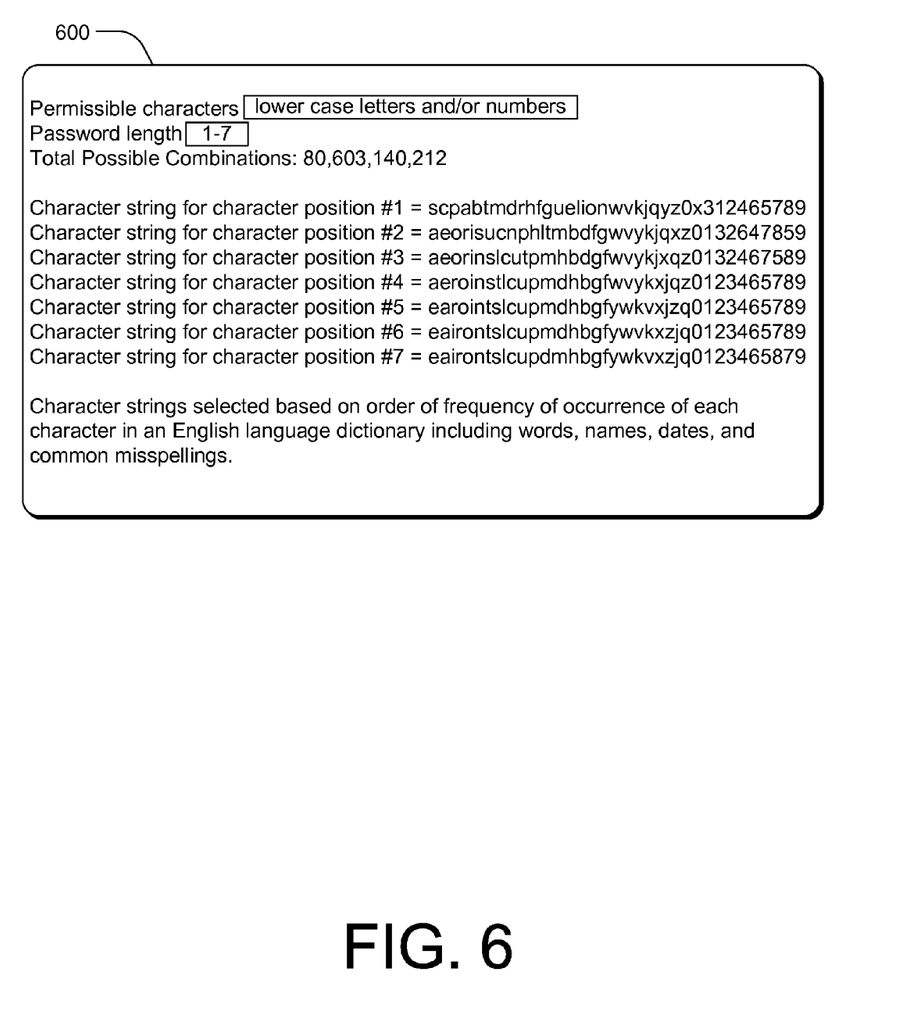
FIG. 6 is a block diagram showing another exemplary password recovery technique using an individual character position-based character string for each character position of a password.

FIG. 6 shows another exemplary password recovery program 600, usable to recover a password. In this example, the password may be one to seven characters long, and may be formulated from thirty-six permissible characters (abcdefghijklmnopqrstuvwxyz0123456789). Accordingly, in this example, there are over eighty billion possible passwords (specifically, 80,603,140,212).

Employing the character position-based word generation techniques, 856368 words were analyzed using a publicly available English dictionary, obtained from Project Gutenberg Literary Archive Foundation of Salt Lake City, Utah (however, any other suitable dictionary could additionally or alternatively be used). The project Gutenberg dictionary included lowercase common names, common dates, lowercase common words, and lower case common misspellings. The first seven character positions of words were analyzed and a character string was generated for each character position, with the characters organized from most common to least common, for each character position. The character strings generated for all seven positions were:

Position #1="scpabtmdrhfguelionwvkjqyz0x312465789"
Position #2="aeorisucnphltmbdfgwvykjqxz0132647859"
Position #3="aeorinslcutpmhbdgfwvykjxqz0132467589"
Position #4="aeroinstlcupmdhbgfwvykxjqz0123465789"
Position #5="earointslcupmdhbgfywkvxjzq0123465789"
Position #6="eairontslcupmdhbgfywvkxzjq0123465789"
Position #7="eairontslcupdmhbgfywkvxzjq0123465879"

From first position to the last position, the character frequencies and hence the orders of the character strings are significantly different. The character position-based techniques described herein may not result in shorter password recovery times for every password, but they will on average provide shorter recovery times than using traditional password recovery methods.

Exemplary Computing Device

Figure 7:
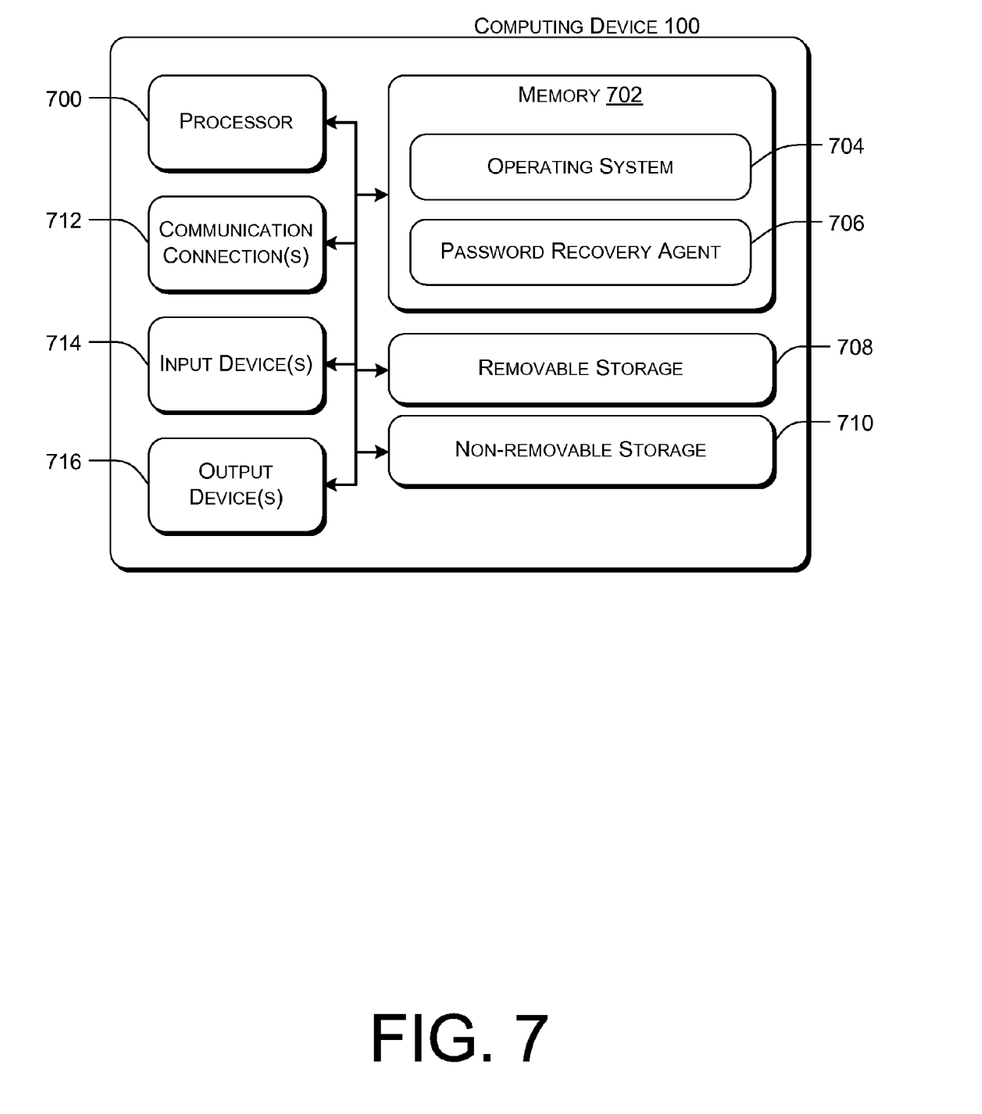
FIG. 7 is a flow chart showing an exemplary character position-based password recovery method.

FIG. 7 illustrates the computer 100 of FIG. 1 in more detail. The computer 100 may be configured as any suitable computing device capable of implementing a password recovery program. In one exemplary configuration, the computer 100 comprises at least one processing unit 700 and memory 702. Depending on the configuration and type of computing device, memory 702 may be volatile (such as RAM) and/or non-volatile (such as ROM, flash memory, etc.).

Memory 302 may include an operating system 804, and a password recovery program or agent 806 for implementing all or a part of a password recovery technique, as well as various other data, programs, media, and the like. The computer 100 may also include additional removable storage 808 and/or non-removable storage 810 including, but not limited to, magnetic storage, optical disks, and/or tape storage. The operating system 804 and/or password recovery agent 806 may additionally or alternatively be stored on the removable storage 808 and/or non-removable storage 810.

Computer storage media includes volatile and nonvolatile, removable and non-removable media implemented in any method or technology for storage of information such as computer readable instructions, data structures, program modules or other data. Memory 302, removable storage 808 and non-removable storage 810 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computer 100.

The computer 100 may also contain communications connection(s) 812 that allow the computer 100 to communicate with one or more other computers, servers, or other computing devices, via a network. By way of example, and not limitation, communication connection(s) 812 may include wired media such as a wired network or direct-wired connection, and wireless media such as acoustic, RF, infrared and other wireless media.

The computer 100 may also include input device(s) 814, such as a keyboard, mouse, pen, voice input device, touch input device, etc., and output device(s) 816, such as a display, speakers, printer, etc. All these devices are well know in the art and need not be discussed at length here.

Exemplary Password Recovery Method

Figure 8:
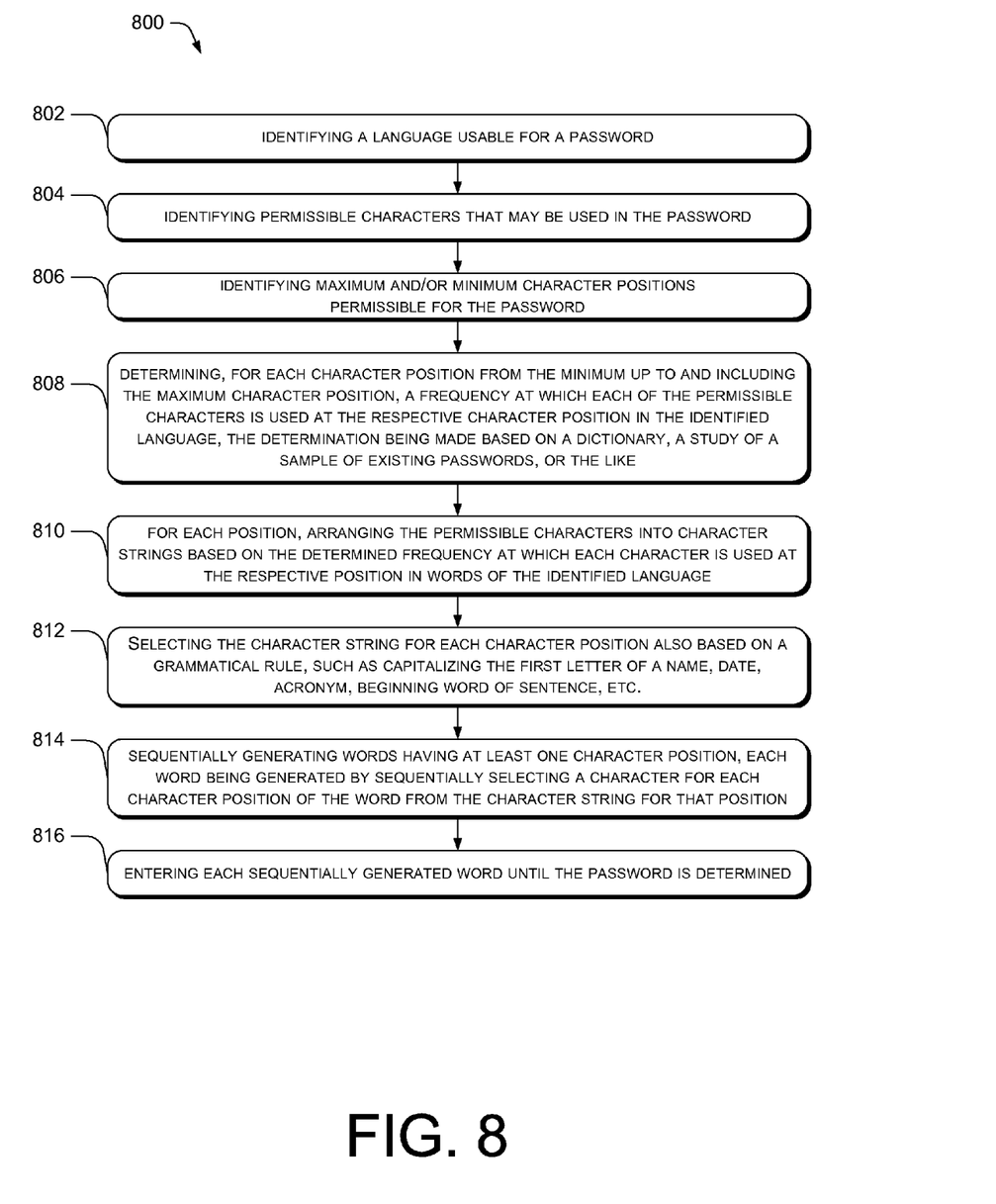
FIG. 8 is a block diagram showing an exemplary password recovery apparatus.

FIG. 8 is a flowchart showing an exemplary password recovery method 800. The method 800 may, but need not, be implemented at least partially by a computing device 1007 such as that shown in FIG. 7, running a password recovery program such as those shown in FIGS. 2-6. The method 800 comprises, at 802, identifying a language usable for a password, at 804, identifying permissible characters that may be used in the password, and at 806.

For each character position from a minimum character position (if any) up to and including the maximum character position (if any) the method includes, at 808, determining a frequency at which each of the permissible characters is used at the respective character position in the identified language. The determination may be made based on a dictionary, a study of a sample of existing passwords, a grammatical rule, or the like.

At 810, the permissible characters are arranged into character strings for each position, based on the determined frequency at which each character is used at the respective position in words of the identified language. The character string for each character position may also be selected, at 812, based on a grammatical rule, such as capitalizing the first letter of a name, date, acronym, beginning word of sentence, etc.

At 814, words may be sequentially generated having at least one character position, each word being generated by sequentially selecting a character for each character position of the word from the character string for that position. The sequentially generated words may be entered, at 816, into a login interface or the like until the password is determined.

Specifics of one exemplary password recovery method 800 are described above. However, it should be understood that certain acts in the password recovery method 800 need not be performed in the order described, may be modified, and/or may be omitted entirely, depending on the circumstances. For example, the words may be generated based the frequency of occurrence in the English language, another language, a set of existing passwords, or a combination of these. Additionally or alternatively, the words may be generated based on one or more grammatical rules, such as capitalizing the first letter of the word, placing a period at the end of the word, placing an apostrophe as the second to last character of the word, and the like.

Moreover, any of the acts described above may be implemented by a computer, processor or other computing device based on instructions stored on one or more computer-readable media. As discussed above, computer-readable media can be any available media that can be accessed by a computing device to implement the instructions stored thereon.

CONCLUSION

Although the subject matter has been described in language specific to structural features and/or methodological acts, the subject matter defined in the appended claims is not necessarily limited to the specific features or acts described. Rather, the specific features and acts are disclosed as exemplary forms of implementing the claims. For example, the methodological acts need not be performed in the order or combinations described herein, and may be performed in any combination of one or more acts.

What is claimed is:

1. One or more computer-readable media usable to determine a password, the computer-readable media comprising instructions, executable by a processor, for:
   generating words, one after another, the words each having at least one character position, each word being generated by selecting characters, one after another, for each character position of the word from a character string for the respective character position, each character string:
      being stored in memory;
      comprising a plurality of permissible characters that may be used in the password, the order of the characters in the character string being individually selected for each character position of the word based on a frequency that each character occurs at the respective character position in words in a database, such that the characters in each character string are ordered from most frequent occurrence at the respective character position to least frequent occurrence at the respective character position and each character string begins with a permissible character most frequently used in the words in the database at the respective position and ends with a permissible character least frequently used in the words in the database at the respective position; and
   entering each generated word, one after another and based on an order in which the words are generated, until the password is determined.

2. The one or more computer-readable media of claim 1, wherein the frequency that each of the characters occurs at each position is determined based on a dictionary.

3. The one or more computer-readable media of claim 2, wherein the dictionary is an English language dictionary.

4. The one or more computer-readable media of claim 2, wherein the dictionary includes names, dates, and common misspellings of words.

5. The one or more computer-readable media of claim 1, wherein the frequency that each of the characters occurs at each position is determined based on a study of a sample of existing passwords.

6. The one or more computer-readable media of claim 1, wherein the frequency that each of the characters occurs at each position is determined based on a grammatical rule.

7. The one or more computer-readable media of claim 1, wherein each character string comprises at least two of lowercase letters, capital letters, numbers, spaces, and symbols.

8. The one or more computer-readable media of claim 1, wherein the character string for the first position of the words is arranged to begin with capital letters.

9. The one or more computer-readable media of claim 1, wherein the character string for the first position of the words comprises letters and numbers arranged in the order: s, c, p, a, b, t, m, d, r, h, f, g, u, e, l, i, o, n, w, v, k, j, q, y, z, 0, x, 3, 1, 2, 4, 6, 5, 7, 8, 9.

10. A computer implemented method comprising:
    under control of one or more processors configured with executable instructions:
       identifying a language usable for a password;
       identifying permissible characters that may be used in the password;
       identifying a maximum character position permissible for the password;
       determining, for each character position up to the maximum character position, a frequency at which each of the permissible characters is used at the respective character position in words of the identified language;

for each position, arranging the permissible characters into character strings based on the determined frequency at which each character is used at the respective position in words of the identified language, such that each character string begins with a permissible character most frequently used at the respective position and ends with a permissible character least frequently used at the respective position;

storing the character strings in memory;

generating words, one after another, the words having at least one character position, each word being generated by selecting characters, one after another, for each character position of the word from the respective character strings stored in memory for that position and in an order based at least in part on a character string, beginning with the character that is most frequently used at the respective position in the words of the identified language; and entering each generated word, one after another and based on an order in which the words are generated, until the password is determined.

11. The method of claim 10, wherein the frequency that each of the characters occurs at each position is determined based on an English language dictionary.

12. The method of claim 11, wherein the dictionary includes names, dates, and common misspellings of words.

13. The method of claim 10, wherein the frequency that each of the characters occurs at each position is determined based on a study of a sample of existing passwords.

14. The method of claim 10, wherein the frequency that each of the characters occurs at each position is determined based on a grammatical rule.

\* \* \* \* \*